(12) United States Patent
Taniguchi et al.

(10) Patent No.: US 9,522,605 B2
(45) Date of Patent: Dec. 20, 2016

(54) CONTACTLESS CHARGING SYSTEM, CHARGING STATION, AND METHOD OF CONTROLLING CONTACTLESS CHARGING SYSTEM

(71) Applicant: TOYOTA JIDOSHA KABUSHIKI KAISHA, Toyota-shi, Aichi-ken (JP)

(72) Inventors: Satoshi Taniguchi, Toyota (JP); Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 165 days.

(21) Appl. No.: 14/595,566

(22) Filed: Jan. 13, 2015

(65) Prior Publication Data

US 2015/0202971 A1 Jul. 23, 2015

(30) Foreign Application Priority Data

Jan. 22, 2014 (JP) ................................ 2014-009369

(51) Int. Cl.

| H02J 7/00 | (2006.01) |
|---|---|
| B60L 11/18 | (2006.01) |
| H02J 5/00 | (2016.01) |
| H02J 7/02 | (2016.01) |

(52) U.S. Cl.
CPC .......... *B60L 11/182* (2013.01); *B60L 11/1824* (2013.01); *B60L 11/1829* (2013.01); *B60L 11/1831* (2013.01); *B60L 11/1833* (2013.01); *H02J 5/005* (2013.01); *H02J 7/025* (2013.01); *Y02T 10/7005* (2013.01); *Y02T 10/7072* (2013.01); *Y02T 90/12* (2013.01); *Y02T 90/121* (2013.01); *Y02T 90/122* (2013.01);
(Continued)

(58) Field of Classification Search
CPC . B60L 11/182; B60L 11/1824; B60L 11/1829; B60L 11/1831; B60L 11/1833; H02J 5/005; H02J 7/025; Y02T 10/7072; Y02T 90/12; Y02T 90/121; Y02T 90/122; Y02T 90/125; Y02T 90/14; Y02T 90/16
See application file for complete search history.

(56) References Cited

U.S. PATENT DOCUMENTS

| 7,741,734 B2 | 6/2010 | Joannopoulos et al. |
| 2007/0222542 A1 | 9/2007 | Joannopoulos et al. |
| 2008/0278264 A1 | 11/2008 | Karalis et al. |

(Continued)

FOREIGN PATENT DOCUMENTS

| AU | 2006269374 B2 | 1/2007 |
| AU | 2006269374 C1 | 1/2007 |

(Continued)

*Primary Examiner* — Vuthe Siek
(74) *Attorney, Agent, or Firm* — Oliff PLC

(57) ABSTRACT

A charging station transmits weak electric power from an available power transmission device of a plurality of power transmission devices when a second communication unit receives a power transmission request signal from a first communication unit. The charging station performs pairing between a vehicle and the power transmission device with which the vehicle has been aligned, in response to reception of an alignment completion signal from the vehicle. The charging station transmits a charging cancellation signal to a vehicle other than the vehicle that has been aligned with the power transmission device, when the pairing is completed.

3 Claims, 3 Drawing Sheets

(52) U.S. Cl.
CPC .............. *Y02T 90/125* (2013.01); *Y02T 90/14* (2013.01); *Y02T 90/16* (2013.01)

(56) References Cited

U.S. PATENT DOCUMENTS

| | | |
|---|---|---|
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2013/0127409 A1 | 5/2013 | Ichikawa |
| 2013/0175987 A1* | 7/2013 | Amma .................. B60L 11/182 320/108 |
| 2013/0193749 A1 | 8/2013 | Nakamura et al. |
| 2014/0103871 A1* | 4/2014 | Maikawa ................ H02J 7/025 320/108 |
| 2015/0115704 A1 | 4/2015 | Gorai et al. |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| EP | 2 843 800 A1 | 3/2015 |
| IN | 735/DELNP/2008 | 5/2008 |
| IN | 6195/DELNP/2009 | 7/2010 |
| JP | A-2009-501510 | 1/2009 |
| JP | A-2013-110822 | 6/2013 |
| JP | A-2013-126327 | 6/2013 |
| JP | A-2013-135572 | 7/2013 |
| JP | A-2013-146148 | 7/2013 |
| JP | A-2013-146154 | 7/2013 |
| JP | A-2013-154815 | 8/2013 |
| JP | A-2013-188066 | 9/2013 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2013/108108 A2 | 7/2013 |
| WO | 2013/141295 A1 | 9/2013 |
| WO | 2013/168281 A1 | 11/2013 |

* cited by examiner

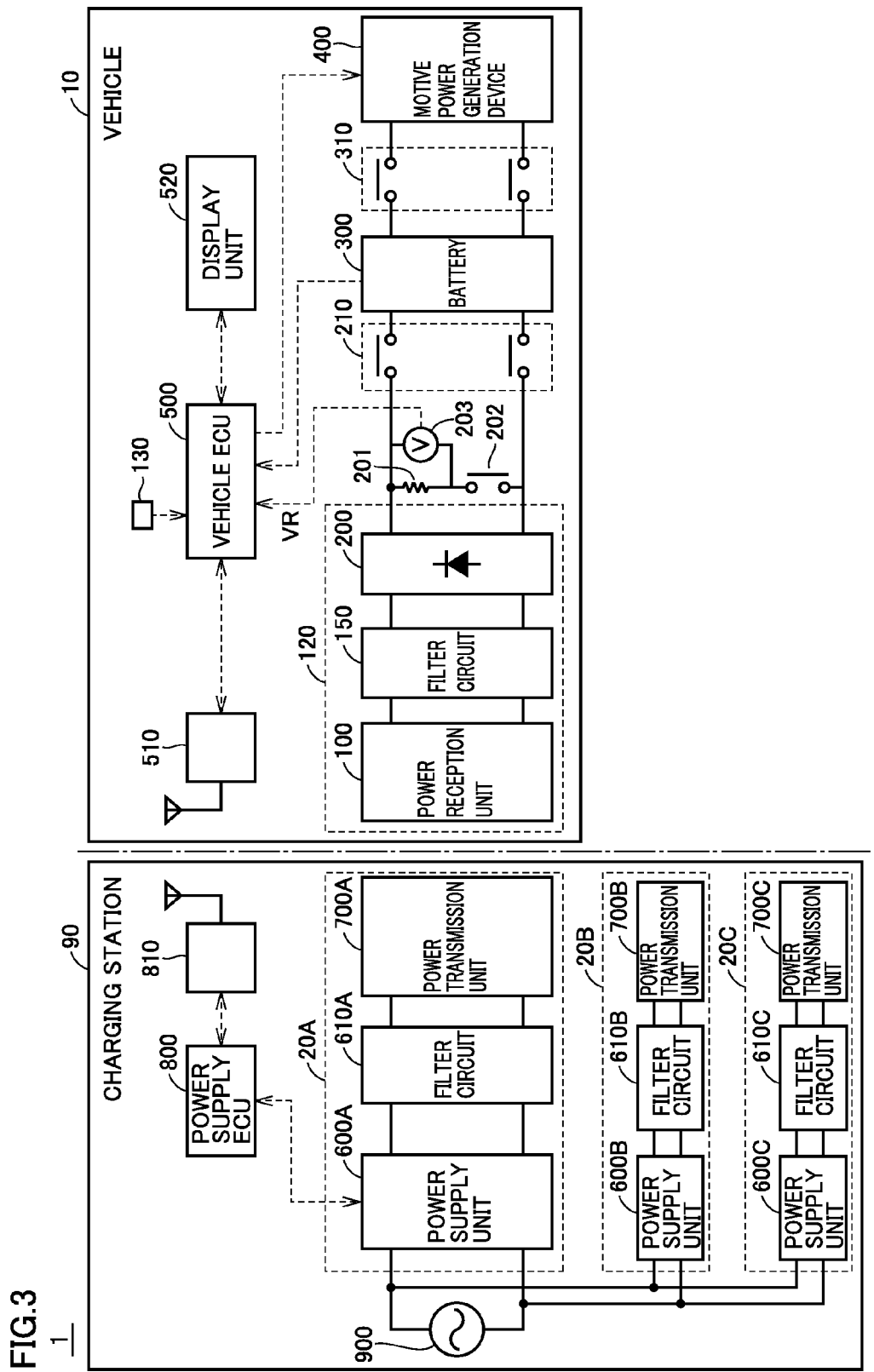

CONTACTLESS CHARGING SYSTEM, CHARGING STATION, AND METHOD OF CONTROLLING CONTACTLESS CHARGING SYSTEM

This nonprovisional application is based on Japanese Patent Application No. 2014-009369 filed on Jan. 22, 2014 with the Japan Patent Office, the entire contents of which are hereby incorporated by reference.

BACKGROUND OF THE INVENTION

Field of the Invention

The present invention relates to a contactless charging system, a charging station, and a method of controlling the contactless charging system.

Description of the Background Art

Conventionally, a system has been proposed in which electric power is transferred from a power transmission device provided in a charging station to a power reception device mounted on a vehicle in a contactless manner to charge the vehicle (hereinafter also referred to as a "contactless charging system").

At the time when electric power is transferred in a contactless manner, it is believed that various types of information are exchanged through communication between the charging station and the vehicle to carry out alignment between the power reception device provided in the vehicle and the power transmission device provided in the charging station, to control charging power, and so on (see Japanese Patent Laying-Open No. 2013-135572, for example).

In the contactless charging system, the charging station may be configured to include a plurality of power transmission devices. With such a configuration, the same number of vehicles as the power transmission devices are charged simultaneously by the charging station.

During alignment between the vehicle and the power transmission device, the vehicle moves toward (approaches) one of the power transmission devices capable of charging the vehicle (available power transmission device). When there are two or more vehicles trying to be charged in the charging station, the two or more vehicles may move toward one power transmission device, resulting in competition between them. In that case, after the first vehicle completes alignment with the power transmission device and is stopped (parked) at the power transmission device, another vehicle may enter space provided with the power transmission device.

When a charging station includes a plurality of power transmission devices, it cannot be understood how many vehicles there are and which one of the power transmission devices they are moving to. It is thus not easy to address the problem described above.

SUMMARY OF THE INVENTION

An object of the present invention is to prevent a vehicle from entering space provided with a power transmission device when another vehicle has been parked at the power transmission device in a contactless charging system provided with a charging station including a plurality of power transmission devices.

In summary, the present invention is directed to a contactless charging system including a vehicle and a charging station, the vehicle including a power reception device and a first communication unit, the charging station including a second communication unit and a plurality of power transmission devices. The charging station transmits weak electric power from an available power transmission device of the plurality of power transmission devices, when the second communication unit receives a power transmission request signal from the first communication unit. The charging station performs pairing between the vehicle and the power transmission device with which the vehicle has been aligned, in response to reception of an alignment completion signal from the vehicle. The charging station transmits a charging cancellation signal to a vehicle other than the (aligned) vehicle, when the pairing is completed.

In the contactless charging system having the configuration described above, when the second communication unit of the charging station receives the power transmission request signal from the first communication unit of the vehicle, weak electric power is transmitted from an available one or ones of the power transmission devices. By utilizing the transmission of this weak electric power, alignment between the vehicle and one of the available power transmission devices can be carried out. In response to reception of the alignment completion signal from the vehicle, the charging station performs pairing between the vehicle and the power transmission device with which the vehicle has been aligned. The pairing is performed so as to identify which one of the plurality of power transmission devices has been aligned with the power reception device. When the pairing is completed, the charging cancellation signal is transmitted to a vehicle other than the aligned vehicle. Consequently, the other vehicle can know, for example, that the other vehicle now cannot be charged by means of the power transmission device. Accordingly, the other vehicle can stop moving toward the power transmission device for charging, and start moving toward another power transmission device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram for illustrating an outline configuration of the contactless charging system.

DESCRIPTION OF THE PREFERRED EMBODIMENTS

Figure 1:
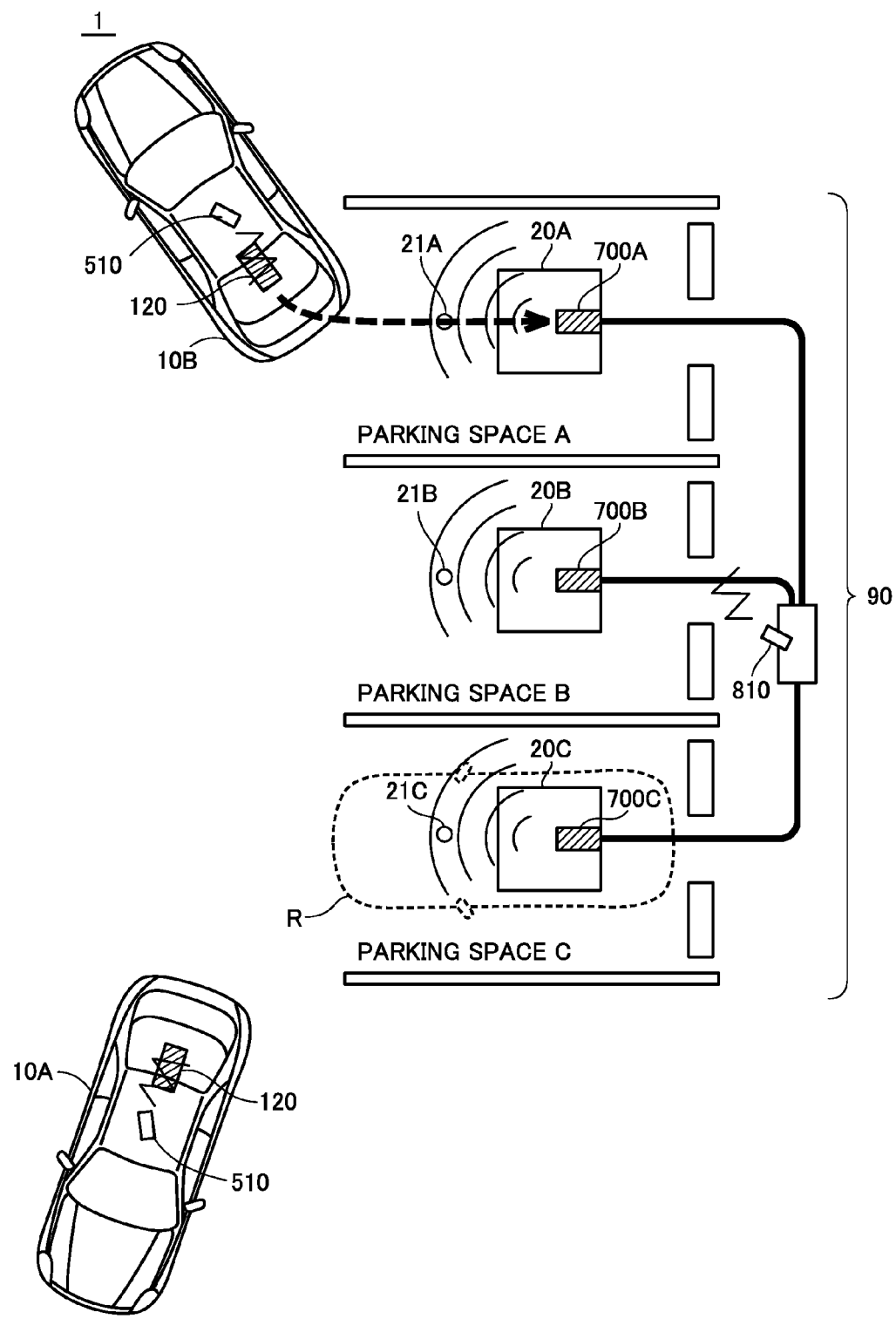
FIG. 1 is a diagram for illustrating a contactless charging system according to an embodiment.

An embodiment of the present invention will be hereinafter described in detail with reference to the accompanying drawings, in which the same or corresponding components are designated by the same reference characters, and description thereof will not be repeated.

FIG. 1 is a diagram for illustrating a contactless charging system 1 according to the embodiment.

Referring to FIG. 1, in contactless charging system 1, contactless power transfer is carried out from a charging station 90 to a vehicle 10A and/or 10B. For example, when vehicle 10A is to be charged through the contactless power transfer, vehicle 10A is parked in one of parking spaces A to C.

First, vehicle 10A will be described. Vehicle 10A includes a power reception device 120 and a communication unit 510.

Power reception device 120 is used for charging (for example, a battery of) vehicle 10A. Power reception device 120 is mounted in the lower part (for example, near a bottom surface) of vehicle 10A, for example. Power reception device 120 receives electric power from one of power transmission devices 20A to 20C included in charging station 90 in a contactless manner.

Communication unit 510 is a first communication unit used for vehicle 10A to perform communication (for example, radio communication) with charging station 90. Communication unit 510 receives a signal from a communication unit 810 (second communication unit) of charging station 90, and also transmits a signal to communication unit 810. In other words, communication unit 510 is configured to be capable of communicating with communication unit 810.

Communication unit 510 can communicate with communication unit 810 not only when located within parking spaces A to C, but also when located outside of parking spaces A to C, for example, at a distance of about 5 to 10 m. Similarly, power reception device 120 can receive electric power from one of power transmission devices 20A to 20C in a contactless manner even when located outside of parking spaces A to C. Consequently, vehicle 10A and charging station 90 can perform communication and contactless power transfer between them even when they are at a certain distance from each other.

Vehicle 10B is configured similarly to vehicle 10A, and thus description thereof will not be repeated.

Next, charging station 90 will be described.

Charging station 90 includes power transmission devices 20A to 20C, sensors 21A to 21C, parking spaces A to C, and communication unit 810. Power transmission devices 20A to 20C include power transmission units 700A to 700C, respectively. Power transmission units 700A to 700C will be described later with reference to FIG. 3.

Parking spaces A to C are for vehicles such as vehicle 10A and vehicle 10B to be parked.

In FIG. 1, for example, a region in which vehicle 10A is located at the time when vehicle 10A is parked such that power reception device 120 of vehicle 10 faces any one of power transmission units 700A to 700C of charging station 90 is shown as a vehicle parking region R. Only one of vehicle 10A and vehicle 10B can be parked in one of parking spaces A to C.

Power transmission devices 20A to 20C are disposed in parking spaces A to C, respectively. A vehicle parked in parking space A is charged by power transmission device 20A. Similarly, a vehicle parked in parking space B is charged by power transmission device 20B, and a vehicle parked in parking space C is charged by power transmission device 20C.

Sensors 21A to 21C detect existence or nonexistence of a vehicle that is parked within parking spaces A to C, respectively. Charging station 90 determines based on the outputs from sensors 21A to 21C whether or not at least one of parking spaces A to C is vacant (no parked vehicle). When at least one of the parking spaces is vacant, charging station 90 issues a broadcast signal to the surroundings. The broadcast signal is for indicating that a vehicle can be parked in the vacant parking space. It can also be said that the broadcast signal is for indicating that a vehicle can be charged by the power transmission device disposed in that parking space. When vehicles are parked in all of parking spaces A to C, charging station 90 does not issue the broadcast signal to the surroundings.

In other words, charging station 90 issues the broadcast signal when at least one of parking spaces A to C is vacant. Consequently, vehicles such as vehicle 10A and vehicle 10B can know, for example, that vehicle 10 can be charged in charging station 90.

When there is a vehicle trying to be charged in charging station 90 (vehicle 10B is trying to be charged here by way of example), positional alignment between power reception device 120 of vehicle 10B and one of power transmission devices 20A to 20C is carried out. More specifically, the alignment means alignment between a power reception unit included in power reception device 120 and power transmission unit 700A included in power transmission device 20A, for example, as will be described later with reference to FIG. 3.

The alignment is carried out so as to perform contactless charging at favorable power transfer efficiency. Specifically, a camera (not shown) is activated in vehicle 10B, and an image of the camera is displayed on a display screen (for example, a display unit 520 in FIG. 3). In addition, weak electric power (minute electric power) is transferred from the power transmission device used for charging vehicle 10B to power reception device 120 of vehicle 10B in a contactless manner. Then, based on a voltage of the electric power received by vehicle 10B, the relative position between power reception device 120 and the power transmission device (one of power transmission devices 20A to 20C) is displayed on the display screen. After vehicle 10B is guided to achieve positional relation where power reception device 120 faces the power transmission device on the display screen, the alignment is completed.

Vehicle 10 issues a power transmission request signal such that the weak electric power is transferred for the alignment. Specifically, the power transmission request signal is transmitted from communication unit 510 of vehicle 10 to communication unit 810 of charging station 90. When communication unit 810 receives the power transmission request signal from communication unit 510, charging station 90 transmits weak electric power from an available one or ones of power transmission devices 20A to 20C. Consequently, alignment between vehicle 10B and the available power transmission device is carried out.

When the alignment is completed, that is, when vehicle 10B is parked in one of parking spaces A to C, vehicle 10B issues an alignment completion signal. Specifically, the alignment completion signal is transmitted from communication unit 510 of vehicle 10B to communication unit 810 of charging station 90.

When communication unit 810 receives the alignment completion signal from communication unit 510, charging station 90 performs a pairing process between vehicle 10 and the power transmission device with which vehicle 10 has been aligned. The pairing process is for causing charging station 90 to identify which one of the plurality of power transmission devices 20A to 20C has been aligned with power reception device 120.

Various contents of the pairing process are conceivable. By way of example, power transmission devices 20A to 20C of charging station 90 may transmit electric power in a plurality of patterns different from one another (power transmission with different ON/OFF cycles or different numbers of ON/OFF switchings, for example). Vehicle 10 transmits a signal, which corresponds to the pattern of received electric power, through communication unit 510 to communication unit 810 of charging station 90. Consequently, charging station 90 can identify the power transmission device with which vehicle 10 has been aligned.

By way of another example, using the RFID (Radio Frequency IDentification) technique, pairing may be performed, for example, in the state where an RFID tag and an RFID leader are provided in vehicle 10 and power transmission devices 20A to 20C, respectively.

It is noted that a vehicle trying to be charged in charging station 90 is not limited to vehicle 10B. In other words, vehicle 10A may be trying to be charged in charging station 90, or a vehicle (not shown) other than vehicle 10A and vehicle 10B may be trying to be charged in charging station 90.

For example, when both vehicle 10A and vehicle 10B are trying to be charged in charging station 90, at the time of alignment, vehicle 10A may move toward (approach) power transmission device 20A, for example, to be parked in parking space A, while vehicle 10B may also move toward power transmission device 20A to be parked in parking space A. In this case, vehicle 10A and vehicle 10B may compete for charging by power transmission device 20A. If vehicle 10B is parked in parking space A prior to vehicle 1 OA, vehicle 1 OA cannot be parked in parking space A. Here, if vehicle 10A is not aware that vehicle 10B has been parked in parking space A, vehicle 10A may enter parking space A where vehicle 10B has been parked.

Accordingly, in contactless charging system 1, when the vehicle (for example, vehicle 10B) is aligned and a pairing process with the power transmission device (for example, power transmission device 20A) is completed, charging station 90 issues a charging cancellation signal to the vehicle (for example, vehicle 10A) other than the aligned vehicle (for example, vehicle 10B). This charging cancellation signal is for indicating that charging by the power transmission device that has been subjected to the pairing process (for example, power transmission device 20A) is now impossible. With this charging cancellation signal, the other vehicle (for example, vehicle 10A) can know that a vehicle has been parked at the power transmission device (for example, power transmission device 20A), and that the other vehicle cannot be charged by the power transmission device (for example, power transmission device 20A). Consequently, the other vehicle (for example, vehicle 10A) is prevented from entering space provided with the power transmission device (for example, power transmission device 20A).

Figure 2:
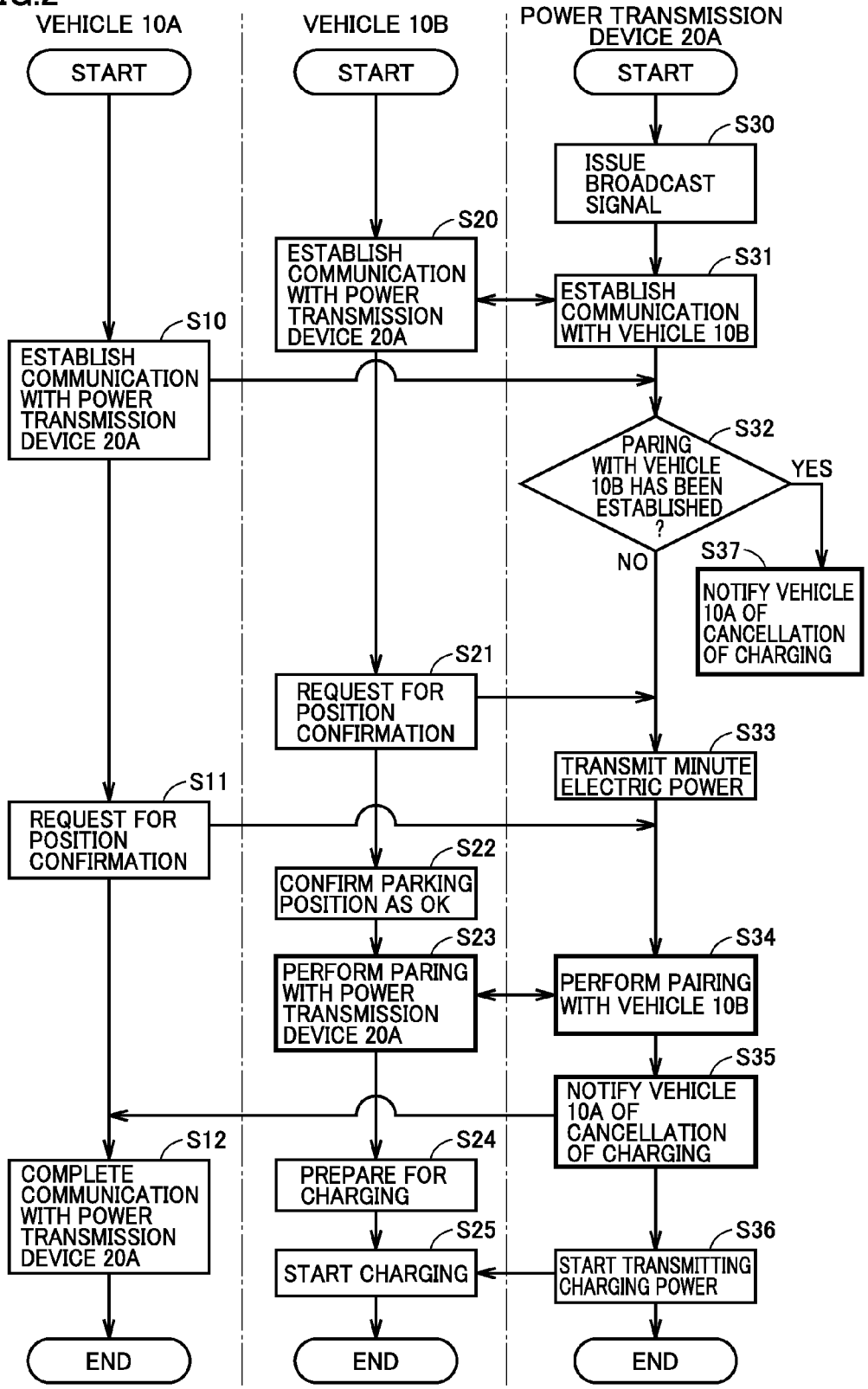
FIG. 2 is a flowchart for illustrating a process performed at the time of contactless charging.

FIG. 2 is a flowchart for illustrating a process performed at the time of contactless charging. This flowchart illustrates, by way of example, a case where two vehicle 10A and vehicle 10B compete for power transmission device 20A of charging station 90 shown in FIG. 1. It is assumed that parking space A provided with power transmission device 20A is vacant without a vehicle parked therein.

Referring to FIGS. 1 and 2, first, power transmission device 20A issues a broadcast signal (step S30).

Then, vehicle 10B receives the broadcast signal from power transmission device 20A to establish communication between vehicle 10B and power transmission device 20A (steps S20 and S31).

It is noted that the phrase "establish communication" in steps S20 and the like in FIG. 2 means that vehicle 10B has only received the broadcast signal from power transmission device 20A. In other words, "establish communication" as used herein does not require bidirectional signal exchange between vehicle 10B and power transmission device 20A.

Subsequent to the establishment of communication between vehicle 10B and power transmission device 20A, communication between vehicle 10A and power transmission device 20A is established (step S10).

Here, power transmission device 20A has already established the communication with vehicle 10B other than vehicle 10A. If vehicle 10B is parked in parking space A and charged by power transmission device 20A, vehicle 10A will not be able to be parked in parking space A. Thus, it is preferable to inform vehicle 10A to that effect.

Accordingly, in power transmission device 20A, it is determined whether paring with vehicle 10B has been established or not (step S32).

If paring has been established in step S32 (YES in step S32), power transmission device 20A notifies vehicle 10A of cancellation of charging (step S37). Specifically, a charging cancellation signal is transmitted through communication unit 810 of charging station 90 to communication unit 510 of vehicle 10A.

If paring has not been established in step S32 (NO in step S32), power transmission device 20A does not notify vehicle 10A of cancellation of charging.

Vehicle 10B makes a request for position confirmation to power transmission device 20A (step S21). Specifically, a power transmission request signal is transmitted from communication unit 510 of vehicle 10B to communication unit 810 of charging station 90.

Consequently, power transmission device 20A starts transmitting minute electric power (weak electric power) (step S33). Specifically, charging station 90 that has received the power transmission request signal transmits weak electric power from an available one or ones of power transmission devices 20A to 20C. In other words, not only power transmission device 20A but also power transmission devices 20B and 20C transmit weak electric power when available.

Vehicle 10B moves toward one of the available power transmission devices. Here, it is assumed that vehicle 10B moves toward power transmission device 20A. In other words, alignment between vehicle 10B and power transmission device 20A is started.

Subsequent to the request for position confirmation from vehicle 10B to power transmission device 20A, vehicle 10A also makes a request for position confirmation to power transmission device 20A (step S11).

When the alignment of vehicle 10B with power transmission device 20A is completed, namely, when it is confirmed that vehicle 10B has been properly parked in parking space A provided with power transmission device 20A (step S22), paring between vehicle 10B and power transmission device 20A is performed (step S23). It is noted that the confirmation of the proper parking of vehicle 10B in parking space A is made by means of sensor 21A, for example.

In response to step S23, pairing between power transmission device 20A and vehicle 10B is performed (step S34).

After the pairing between power transmission device 20A and vehicle 10B is performed in step S34, power transmission device 20A notifies vehicle 10A of cancellation of charging (step S35).

In response to the notification of the cancellation of charging from power transmission device 20A, vehicle 10A completes the communication with power transmission device 20A (step S12). Then, vehicle 10A ends the process of the flowchart shown in FIG. 2.

After the pairing between vehicle 10B and power transmission device 20A is performed in step S23, vehicle 10B prepares for charging (step S24). Consequently, vehicle 10B is rendered ready for contactless charging.

Power transmission device 20A starts transmitting charging power for charging vehicle 10B (step S36). Then, power transmission device 20A ends the process of the flowchart shown in FIG. 2.

Vehicle 10B starts being charged with the charging power transmitted from power transmission device 20A (step S25). Then, vehicle 10B ends the process of the flowchart shown in FIG. 2.

According to the flowchart of FIG. 2, when vehicle 10B is to be charged by power transmission device 20A, vehicle 10A is notified of the cancellation of charging upon completion of the pairing between power transmission device 20A and vehicle 10B. Consequently, vehicle 10A is prevented from entering the space provided with power transmission device 20A. In addition, vehicle 10A can consider charging by a power transmission device (power transmission device 20B or 20C) other than power transmission device 20A.

FIG. 3 is a diagram for illustrating an outline configuration of contactless charging system 1 according to the embodiment of the present invention. Vehicle 10 shown in FIG. 3 is a vehicle such as vehicle 10A and vehicle 10B shown in FIG. 1.

First, vehicle 10 of contactless charging system 1 will be described.

Vehicle 10 includes a vehicle ECU (Electric Control Unit) 500 serving as a control unit. Vehicle ECU 500 includes a CPU (Central Processing Unit), a storage device, an input/output buffer, and the like (none shown). Vehicle ECU 500 inputs the signals from various sensors and outputs the control signal to each device while controlling each device in vehicle 10. By way of example, vehicle ECU 500 performs running control of vehicle 10, and charging control of a battery 300. It is noted that the above-described control is not limited to the process by software, but can be carried out by dedicated hardware (an electronic circuit).

In addition to power reception device 120 and communication unit 510 shown in FIG. 1, vehicle 10 further includes a contactless charging switch 130, a resistance 201, a relay 202, a voltage sensor 203, battery (B) 300, a system main relay (SMR) 310, a motive power generation device 400, vehicle ECU 500, and display unit 520.

Power reception device 120 includes a power reception unit 100, a filter circuit 150, and a rectifier 200. Power reception unit 100 includes a secondary coil (power reception coil) for receiving alternating-current (AC) power output from any one of power transmission units 700A to 700C in a contactless manner. The electric power received by power reception unit 100 is output to filter circuit 150. Filter circuit 150 suppresses the harmonic noise. Filter circuit 150 is configured by an LC filter including an inductor and a capacitor, for example.

Power reception unit 100 includes a capacitor in addition to the secondary coil. The secondary coil and the capacitor form a resonance circuit. It is preferable that a Q factor indicating the resonance strength be equal to or higher than 100.

The AC power having the harmonic noise suppressed by filter circuit 150 is output to rectifier 200. Rectifier 200 rectifies the AC power. The electric power rectified by rectifier 200 is output as charging power of battery 300.

A relay 210 is provided between rectifier 200 and battery 300. Relay 210 is brought into conduction (ON) when battery 300 is charged with the electric power from charging station 90.

A relay 202 is provided between rectifier 200 and relay 210. In addition, resistance 201 is connected in series with relay 202. Moreover, voltage sensor 203 is provided to be capable of detecting a voltage across resistance 201 (voltage VR of received electric power).

Battery 300 is configured of a secondary battery such as a lithium-ion battery or a nickel-metal hydride battery, for example. The voltage of battery 300 is, for example, approximately 200 V. Battery 300 is also charged with electric power from motive power generation device 400 which will be described later. In addition, battery 300 discharges to motive power generation device 400. Although not particularly shown, a DC-DC converter that adjusts the output voltage of rectifier 200 may be provided between rectifier 200 and battery 300.

Motive power generation device 400 generates driving power for running of vehicle 10A using the electric power stored in battery 300. Although not particularly shown, motive power generation device 400 includes, for example, an inverter receiving electric power from battery 300, a motor driven by the inverter, driving wheels driven by the motor, and the like. In addition, motive power generation device 400 may also include a power generator for charging battery 300 and an engine capable of driving the power generator.

Contactless charging switch 130 is configured to be operated by the user. Contactless charging switch 130 is used, for example, to determine based on an ON or OFF state thereof whether the user is trying for contactless charging of vehicle 10 or not.

Communication unit 510 is a first communication unit configured to be capable of communicating with communication unit 810 included in charging station 90.

Display unit 520 displays, for example, the relative positional relation between power reception unit 100 and each of power transmission units 700A to 700C. The user can park vehicle 10 within charging station 90 by using the display on display unit 520 as a reference. Specifically, the user can drive vehicle 10 by using the display on display unit 520 as a reference, to align power reception unit 100 of vehicle 10 with one of power transmission units 700A to 700C of charging station 90. It is noted that the alignment can be automatically carried out by vehicle ECU 500 controlling vehicle 10.

Next, charging station 90 of contactless charging system 1 will be described.

Charging station 90 includes an external power supply 900, communication unit 810, a power supply ECU 800, and power transmission devices 20A to 20C.

Power transmission device 20A includes a power supply unit 600A, a filter circuit 610A, and power transmission unit 700A. Power transmission device 20B includes a power supply unit 600B, a filter circuit 610B, and power transmission unit 700B. Power transmission device 20C includes a power supply unit 600C, a filter circuit 610C, and power transmission unit 700C. Since power transmission devices 20A to 20C are configured similarly, power transmission device 20A will be mainly described below and description of power transmission devices 20B and 20C will not be repeated.

Power transmission unit 700A includes a primary coil (power transmission coil) for transmitting AC power in a contactless manner. Power transmission unit 700A includes a capacitor in addition to the primary coil. The primary coil and the capacitor form a resonance circuit. It is preferable that a Q value indicating the resonance strength be equal to or higher than 100. Power transmission unit 700A is disposed on the surface of the ground or in the ground of parking space in which vehicle 10 is parked (for example, parking spaces A to C in FIG. 1).

Power supply ECU 800 includes a CPU, a storage device, an input/output buffer, and the like (none shown). Power supply ECU 800 inputs the signals from various sensors and outputs the control signal to each device while controlling each device in charging station 90. By way of example, power supply ECU 800 carries out switching control of power supply unit 600A such that power supply unit 600A generates AC power having a transmission frequency. It is noted that the above-described control is not limited to the process by software, but can be carried out by dedicated hardware (an electronic circuit).

It is noted that, at the time of electric power transmission to vehicle 10, power supply ECU 800 causes communication unit 810 to communicate with communication unit 510 of vehicle 10, to exchange information including start/stop of charging, the power receiving conditions of vehicle 10 and the like with vehicle 10.

Communication unit 810 is a second communication unit used for performing communication with communication unit 510 of vehicle 10.

With the configuration as described above, charging station 90 can communicate with vehicle 10 to guide (power reception unit 100 of) vehicle 10 to one of power transmission units 700A to 700C. Consequently, alignment between power reception unit 100 and the one of power transmission units 700A to 700C is carried out.

At the time of the alignment, weak electric power (small electric power) from charging station 90 is transmitted to vehicle 10. Here, relay 202 is brought into conduction (ON), and the magnitude of voltage VR of received electric power that is generated across resistance 201 and detected by voltage sensor 203 is obtained. Since voltage VR of received electric power at the time of alignment is smaller than voltage VR of received electric power at the time of full-scale power transmission, relay 210 is not brought into conduction (OFF) so as not to be influenced by battery 300 during voltage detection. By using the value of voltage VR of received electric power as a reference, power reception unit 100 of vehicle 10 is aligned with one of power transmission units 700A to 700C such that the electric power is transferred efficiently from charging station 90 to vehicle 10.

It is noted that the process of the flowchart shown in FIG. 2 is performed by control of power supply ECU 800 of charging station 90 and vehicle ECU 500 of vehicle 10.

Lastly, the embodiment of the present invention will be summarized. Referring to FIG. 1, contactless charging system 1 includes the vehicle (for example, vehicle 10B) and charging station 90. The vehicle (for example, vehicle 10B) includes power reception device 120 and the first communication unit (communication unit 510). Charging station 90 includes the second communication unit (communication unit 810) and the plurality of power transmission devices (power transmission devices 20A to 20C). When the second communication unit (communication unit 810) receives a power transmission request signal from the first communication unit (communication unit 510), charging station 90 transmits weak electric power from an available one or ones of the plurality of power transmission devices (power transmission devices 20A to 20C). In response to reception of an alignment completion signal from the vehicle (for example, vehicle 10B), charging station 90 performs pairing between the vehicle (for example, vehicle 10B) and the power transmission device (for example, power transmission device 20A) with which the vehicle (for example, vehicle 10B) has been aligned. When the pairing is completed, charging station 90 transmits a charging cancellation signal to a vehicle (for example, vehicle 10A) other than the vehicle (for example, vehicle 10B).

In contactless charging system 1 according to the embodiment of the present invention, when communication unit 810 of charging station 90 receives the power transmission request signal from communication unit 510 of vehicle 10B, for example, weak electric power is transmitted from an available one or ones of power transmission devices 20A to 20C. By utilizing the transmission of this weak electric power, alignment between vehicle 10B and one of the available power transmission devices, for example, power transmission device 20A, can be carried out. In response to reception of the alignment completion signal from vehicle 10B, charging station 90 performs pairing between vehicle 10B and power transmission device 20A with which vehicle 10B has been aligned. When the pairing is completed, charging station 90 transmits the charging cancellation signal to vehicle 10A other than aligned vehicle 10B. Consequently, vehicle 10A can know, for example, that vehicle 10A now cannot be charged by power transmission device 20A. Accordingly, vehicle 10A can stop moving toward power transmission device 20A for charging, and start moving toward another power transmission device (power transmission device 20B or power transmission device 20C), for example. Therefore, vehicle 10A is prevented from entering the space provided with power transmission device 20A where vehicle 10B has been parked.

Although the embodiments of the present invention have been described above, it should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

What is claimed is:

1. A contactless charging system comprising a vehicle and a charging station,
   said vehicle including
      a power reception device, and
      a first communication unit,
   said charging station including
      a second communication unit, and
      a plurality of power transmission devices,
   said charging station transmitting weak electric power from an available power transmission device of said plurality of power transmission devices, when said second communication unit receives a power transmission request signal from said first communication unit,
   said charging station performing a pairing process between said vehicle and the power transmission device with which said vehicle has been aligned, in response to reception of an alignment completion signal from said vehicle,
   said charging station transmitting a charging cancellation signal to a vehicle other than said vehicle, when said pairing process is completed.

2. A charging station comprising:
   a plurality of power transmission devices each configured to transmit electric power to a power reception device of a vehicle in a contactless manner;
   a communication unit for communicating with said vehicle; and
   a control unit that controls said plurality of power transmission devices to output weak electric power from an available power transmission device of said plurality of power transmission devices, when said communication unit receives a power transmission request signal from said vehicle, said control unit further performing a pairing process between said vehicle and the power transmission device with which said vehicle has been aligned, in response to reception of an alignment completion signal from said vehicle, said control unit causing said communication unit to transmit a charging cancellation signal to a vehicle other than said vehicle, when said pairing process is completed.

3. A method of controlling a contactless charging system, said contactless charging system including a vehicle having a power reception device, and a charging station having a plurality of power transmission devices, said method comprising the steps of:

transmitting weak electric power from an available power transmission device of said plurality of power transmission devices, when a power transmission request signal is transmitted from said vehicle to said charging station;

performing a pairing process between said vehicle and the power transmission device with which said vehicle has been aligned, in response to reception by said charging station of an alignment completion signal from said vehicle; and transmitting a charging cancellation signal to a vehicle other than said vehicle from said charging station, when said pairing process is completed.

* * * * *